No. 711,975. Patented Oct. 28, 1902.
J. G. JOHNSON.
PLOW OR CULTIVATOR HANDLE.
(Application filed July 5, 1902.)
(No Model.)
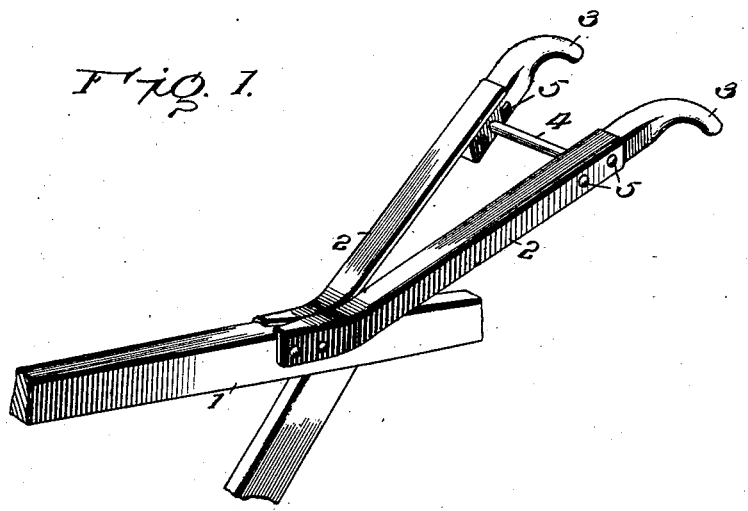
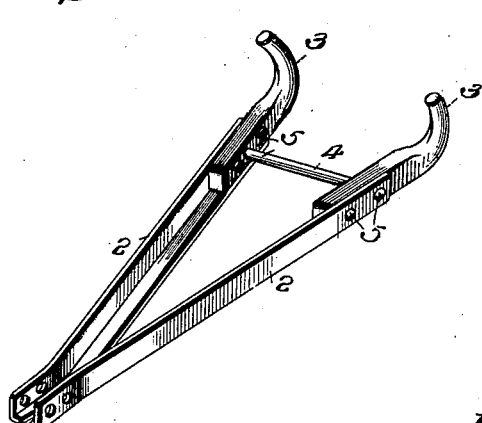
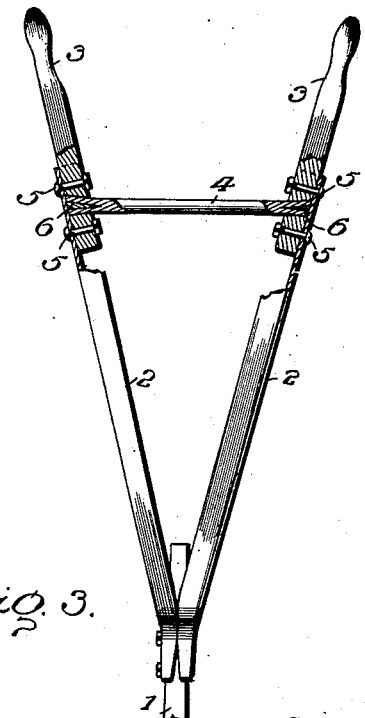
Witnesses
Inventor
John G. Johnson
By R. S. & A. B. Lacey, Attorneys

UNITED STATES PATENT OFFICE.

JOHN G. JOHNSON, OF GORDON, PENNSYLVANIA.

PLOW OR CULTIVATOR HANDLE.

SPECIFICATION forming part of Letters Patent No. 711,975, dated October 28, 1902.

Application filed July 5, 1902. Serial No. 114,507. (No model.)

*To all whom it may concern:*

Be it known that I, JOHN G. JOHNSON, a citizen of the United States, residing at Gordon, in the county of Schuylkill and State of Pennsylvania, have invented certain new and useful Improvements in Plow or Cultivator Handles, of which the following is a specification.

The purpose of this invention is the provision of handles specially adapted for plows, cultivators, and like agricultural implements manipulated by hand when in operation, which will be light, strong, and durable, and combine all the advantages of the ordinary wooden handles and the strength of metal.

In accordance with this invention the handles are composed of metal and wood, the grips being of wood and the remaining portion of metal. This construction obviates the objectionable feature of metal grips and combines all the advantages of metal handles and wooden grips.

The invention consists of the novel features and details of construction which hereinafter will be more particularly set forth, illustrated, and finally claimed.

In the drawings hereto attached and forming a part of the specification, Figure 1 is a perspective view of a combined plow and cultivator equipped with handles embodying the invention. Fig. 2 is a perspective view of the handles detached from the beam or implement and inverted. Fig. 3 is a detail view, partly in section, showing the manner of attaching a grip to the cross-bar and to a handle-bar.

Corresponding and like parts are referred to in the following description and indicated in all the views of the drawings by the same reference characters.

The implement illustrated is typical of the class of machines for which the invention is designed and is a plow or cultivator of ordinary construction, the handles being connected to the beam 1 in the usual way—that is, by being bolted thereto. The handles comprise the bars 2, grips 3, and cross-bar 4. The handle-bars 2 are of metal, being of L form in transverse section, whereby they are braced against vertical and lateral stress. The grips 3 are of wood and their outer ends are curved and rounded in the accustomed way and their inner ends are of angular formation to snugly fit in the angle formed between the wings of the respective handle-bars 2. The inner ends of the grips are secured to the outer ends of the handle-bars, preferably by being bolted to the vertical or side wings, as shown at 5. The cross-bar 4 has its ends let into transverse openings bored laterally through the inner end portions of the grips 3, wedges 6 being driven into clefts in the ends of the cross-bar, so as to spread the same and insure firm connection between the cross-bar and grips. The wedges cannot work loose and move outward, because they are confined by the vertical or side flanges of the handle-bars, and said flanges also conceal the outer ends of the cross-bar and prevent any moisture finding its way into the bores or openings into which the ends of the cross-bars are fitted, this being of vital importance to the lightness and period of usefulness of the handles.

Wooden grips do not sweat the hands or cause the annoyance and discomfort resulting from metal grips, and by having the handle-bars 2 constructed of L-beams lightness and durability result.

Having thus described the invention, what is claimed as new is—

Handles for agricultural implements comprising wooden grips having transverse bores or openings therethrough, a cross-bar having its end portions fitted in said openings, wedges driven into clefts in the outer ends of said cross-bar, and metal handle-bars of L form in transverse section secured to the inner end portions of the grips to confine the wedges and conceal the outer ends of said cross-bar and the outer ends of the openings into which the terminals of said cross-bar are fitted, substantially as specified.

In testimony whereof I affix my signature in presence of two witnesses.

JOHN G. JOHNSON. [L. S.]

Witnesses:
THOMAS C. MCANDREW,
GEORGE J. JOHNSON.